(12) United States Patent
Kim et al.

(10) Patent No.: US 7,072,541 B2
(45) Date of Patent: Jul. 4, 2006

(54) BIDIRECTIONAL OPTICAL TRIPLEXER

(75) Inventors: Kyoung-Youm Kim, Seoul (KR); Sun-Tae Jung, Anyang-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 30 days.

(21) Appl. No.: 10/849,071

(22) Filed: May 19, 2004

(65) Prior Publication Data

US 2005/0100273 A1    May 12, 2005

(30) Foreign Application Priority Data

Nov. 11, 2003  (KR) .................... 10-2003-0079545

(51) Int. Cl.
*G02B 6/28* (2006.01)

(52) U.S. Cl. .................. 385/24; 385/47; 385/132; 398/43

(58) Field of Classification Search ............. 385/27, 385/37, 14, 47, 132; 398/43
See application file for complete search history.

(56) References Cited

U.S. PATENT DOCUMENTS

| 4,790,615 | A | * | 12/1988 | Seki et al. ............... 385/129 |
| 6,061,487 | A | * | 5/2000 | Toyama et al. ........... 385/47 |
| 6,647,184 | B1 | * | 11/2003 | Ukechi et al. ............ 385/47 |
| 6,684,012 | B1 | * | 1/2004 | Kimura .................... 385/49 |
| 2004/0223682 | A1 | * | 11/2004 | Ding et al. ............... 385/14 |
| 2005/0078913 | A1 | * | 4/2005 | Blauvelt et al. .......... 385/39 |

* cited by examiner

*Primary Examiner*—Michelle Connelly-Cushwa
*Assistant Examiner*—James D. Stein
(74) *Attorney, Agent, or Firm*—Cha & Reiter, L.L.C.

(57) ABSTRACT

A bidirectional optical triplexer is disclosed, which may be connected to an external optical waveguide and receives first and second optical signals having first and second wavelengths through the external optical waveguide, and transmits a third optical signal having a third wavelength. The triplexer includes a platform having first and second trenches spaced from each other on a first optical path optically connected with the external optical waveguide, a first filter positioned in the first trench for reflecting the first optical signal proceeding through the first optical path to a second optical path, and a second filter positioned in the second trench for reflecting the second optical signal proceeding through the first optical path to a third optical path. The triplexer also includes a first optical receiver for detecting the first optical signal proceeding through the second optical path, a second optical receiver for detecting the second optical signal proceeding through the third optical path, and an optical transmitter for outputting the third optical signal to the first optical path. The first and the second optical receiver may be aligned at a first side of the first and the second trenches and the optical transmitter may be aligned at a second side of the first and the second trenches. The first side is opposite to the second side about the first and second trenches.

12 Claims, 7 Drawing Sheets

BIDIRECTIONAL OPTICAL TRIPLEXER

CLAIM OF PRIORITY

This application claims priority to an application entitled "Bidirectional optical triplexer," filed in the Korean Intellectual Property Office on Nov. 11, 2003 and assigned Serial No. 2003-79545, the contents of which are hereby incorporated by reference.

BACKGROUND OF THE INVENTION

1. Field of the Invention

The present invention relates to FTTx systems (fiber to the x, x=Premises, Home, Business, etc.), and more particularly to a bidirectional optical triplexer applied to the FTTx systems.

2. Description of the Related Art

FTTH is an abbreviation of "fiber to the home". Also, when 'H' of FTTH is replaced with 'P', FTTP means "fiber to the premises". Although FTTx has different meanings depending on the last letter 'x' of FTTx, each of FTTH and FTTP has the same technical principle of transmitting data using optical fiber to a terminal connected to an optical communication network. FTTH system can be used to combine communication, broadcasting, and Internet data, and to integrate data, video, and voice information (called a "triple play").

A bidirectional optical triplexer processes input/output signals of three wavelengths. An ONT (optical network terminal) included in a subscriber terminal processes a digital data signal having a wavelength of about 1490 nm and an analog video signal having a wavelength of about 1550 nm as input signals. A data signal having a wavelength of about 1310 nm is provided as an output signal. The output signal is transmitted to an OLT (optical line terminal) from the ONT.

FIG. 1 is a diagram showing a conventional bidirectional optical triplexer structure. An optical triplexer 100 includes a platform 120, first and second filters (FT) 130 and 140, first and second photodiode-transimpedance amplifier (PD-TIA) modules 150 and 160, a laser diode (LD) 170, and a monitoring PD (MPD) 180.

The platform 120 includes an optical path 125 optically connected to an external optical waveguide 110. The first and the second FTs 130 and 140 and the LD 170 are spaced from each other on the optical path 125.

The first filter (FT1) 130 is configured to reflect a first optical signal 190 that is an analog video signal having a wavelength of 1550 nm proceeding through the optical path 125. The first filter 130 transmits optical signals having wavelengths other than 1550 nm. The first filter 130 transmits a second optical signal 195 that is a digital data signal having a wavelength of 1490 nm and a third optical signal 175 that is a digital data signal having a wavelength of 1310 nm.

The second filter (FT2) 140 is configured to transmit the third optical signal 175 proceeding through the optical path 125 and to reflect an optical signal having a wavelength different from that of the third optical signal 175, i.e., the second optical signal 195.

The laser diode 170 outputs the third optical signal 175. The monitoring PD 180 monitors the third optical signal output from the laser diode 170.

The first optical signal 190 input to the internal optical path 125 is reflected by the first filter 130 and then is detected by the first PD-TIA module 150. The second optical signal 195 input into the second filter 140 after being transmitted by the first filter 130 is reflected by the second filter 140 and then detected by the second PD-TIA module 160. The third optical signal 175 output from the laser diode 170 sequentially transmitted through the second filter 140 and the first filter 130 is then output to the external optical waveguide 110.

However, the conventional optical triplexer 100 described above has a problem in that a size of the platform 120, in which components are integrated, is enlarged because of the various components that are required for the optical triplexer 100.

In this regard, if the laser diode 170 is physically positioned close to the first or the second PD-TIA module 150 or 160 in order to reduce the size of the platform 120, optical and electrical crosstalk occurs between elements. In this situation, the first or the second PD-TIA module 150 or 160 may falsely recognizes that an optical signal has been input.

In addition, since the filters cannot be perfectly manufactured, crosstalk may nevertheless occur. Ideally, the first optical signal 190 is completely reflected from the first filter 130. However, if a portion of the first optical signal 190 passes through the first filter 130, it is reflected by the second filter 140 and is then input to the second PD-TIA module 160. When this happens, the second PD-TIA module 160 falsely recognizes that the second optical signal is received, even though the second PD-TIA module 160 is not actually received, so a malfunction in the system occurs.

An analog video signal's intensity is generally about 10 dB larger than a digital data signal's intensity (even through it may vary depending on data format). This means that it is not possible to separate the optical signals by using only one filter. This, therefore, requires that another filter filtering operation mist be performed on the analog video signal.

Accordingly, there is a need in the art for an improved bi-directional optical triplexers.

SUMMARY OF THE INVENTION

Accordingly, one object of the present invention is to solve the above-mentioned problems occurring in the prior art.

Another object of the present invention is to provide an improved bidirectional optical triplexer.

Another object of the present invention is to reduce the crosstalk between elements.

Yet another object of the present invention is to reduce the size of a platform in order to make the bidirectional optical triplexer smaller.

One embodiment of the present invention is directed to a bidirectional optical triplexer, which is connected with an external optical waveguide. The triplexer receives first and second optical signals having first and second wavelengths through the external optical waveguide, and transmits a third optical signal having a third wavelength. The bidirectional optical triplexer includes a platform having first and second trenches spaced from each other on a first optical path optically connected with the external optical waveguide, a first filter fixed in the first trench for reflecting the first optical signal proceeding through the first optical path to a second optical path, and a second filter fixed in the second trench for reflecting the second optical signal proceeding through the first optical path to a third optical path. The bidiretional optical triplexer also includes a first optical receiver for detecting the first optical signal proceeding through the second optical path, a second optical receiver for detecting the second optical signal proceeding through the third optical path, and an optical transmitter for outputting the third optical signal to the first optical path. The first and the second optical receiver are aligned at a first side of the first and the second trenches and the optical transmitter is aligned at a second side of the first and the second trenches. The first side is opposite to the second side about the first and second trenches.

BRIEF DESCRIPTION OF THE DRAWINGS

The above and other objects, features and embodiments of the present invention will be more apparent from the following detailed description taken in conjunction with the accompanying drawings, in which.

DETAILED DESCRIPTION OF THE PREFERRED EMBODIMENT

Figure 1:
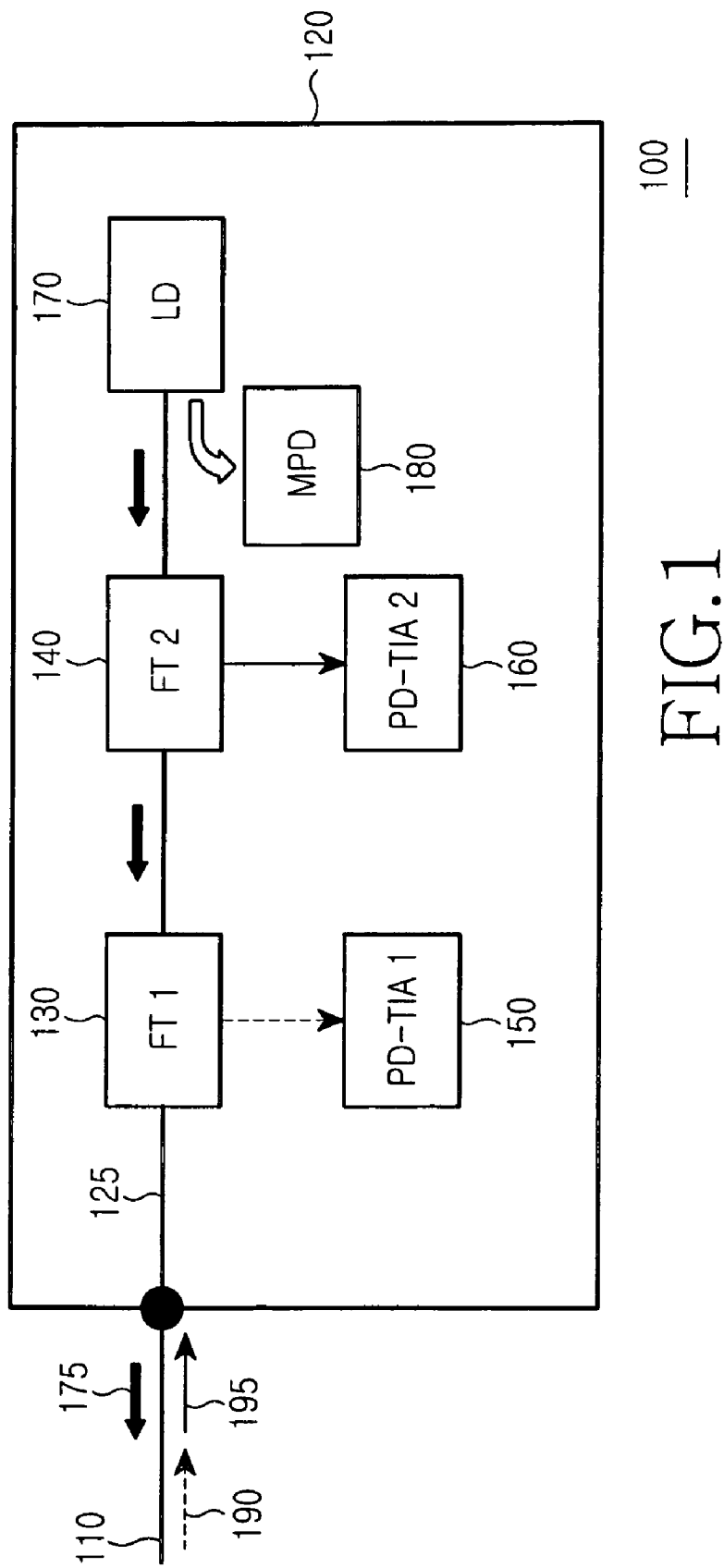
FIG. 1 is a diagram showing a conventional bidirectional optical triplexer structure.

Embodiments of the present invention will be described in detail with reference to the accompanying drawings. Note that the same or similar components in drawings are designated by the same reference numerals as far as possible although they are shown in different drawings. For the purposes of clarity and simplicity, a detailed description of known functions and configurations incorporated herein will be omitted as it may obscure the subject matter of the present invention.

Figure 2:
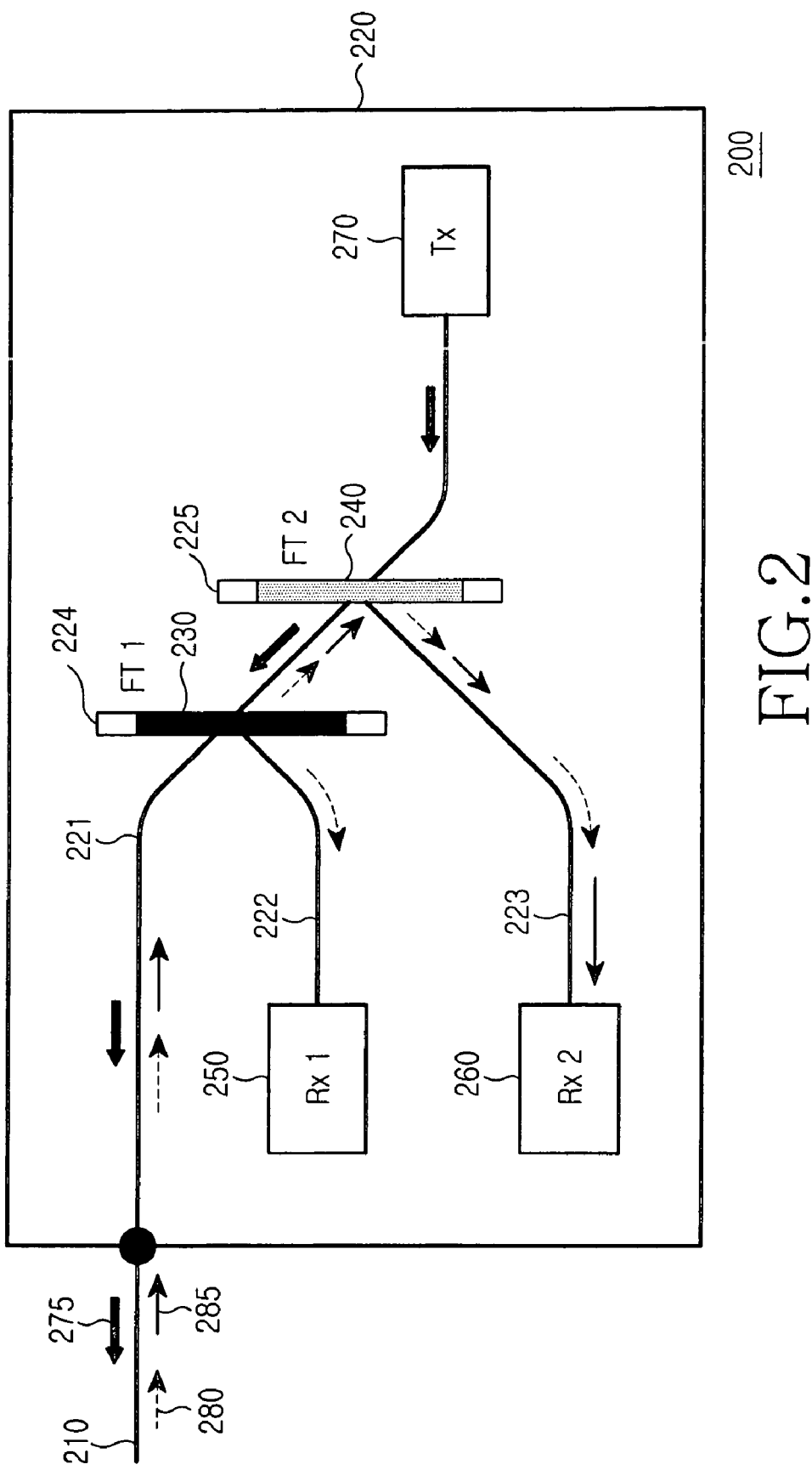
FIG. 2 is a diagram showing a bidirectional optical triplexer according to a first embodiment of the present invention.

FIG. 2 is a diagram showing a bidirectional optical triplexer 200 according to a first embodiment of the present invention. The optical triplexer 200 includes a platform 220, first and second filters 230 and 240, first and second optical receivers (Rxs) 250 and 260, and an optical transmitter 270. The optical triplexer 200 can be connected to an external optical waveguide 210. Also, the optical triplexer 200 can receive a first optical signal 280, which may be an analog video signal having about a 1550 nm wavelength, and a second optical signal 285, which may be a digital data signal having about a 1490 nm wavelength, through the external optical waveguide 210. In addition, the optical triplexer 200 transmits a third optical signal 275, which may be a digital data signal having about a 1310 nm wavelength, through the external optical waveguide 210.

The platform 220 includes a first optical path 221, which can be optically connected with the external optical waveguide 210, first and second trenches 224 and 225, which are spaced from each other on the first optical path 221, a second optical path 222, which extends from the first trench 224, and a third optical path 223, which extends from the second trench 225. The platform 220 includes a semiconductor wafer obtained by dicing a semiconductor device. In this case, the first and second trenches 224 and 225 are formed in such a manner that the first and the second trenches 224 and 225 are aligned parallel to dicing lines formed in a vertical direction or in a horizontal direction of entire semiconductor chips for dicing semiconductor chips in a wafer unit.

The first filter 230 is positioned in the first trench 224. The first filter 230 reflects the first optical signal 280 proceeding through the first optical path 221 to the second optical path 222. In addition, the first filter 230 transmits optical signals of predetermined wavelengths, i.e., the second and the third optical signals 285 and 275.

The second filter 240 is positioned in the second trench 225. The second filter 240 transmits the third optical signal 275 proceeding through the first optical path 221 and reflects an optical signal of a predetermined wavelength, i.e., the second optical signal 285, to the third optical path 223. The first and the second filters 230 and 240 may include optical filters obtained by stacking a multiple-layered film on a glass substrate.

The first optical receiver 250 converts the first optical signal 280 proceeding through the second optical path 222 into a first electrical signal.

The second optical receiver 260 converts the second optical signal 285 proceeding through the third optical path 223 into a second electrical signal. The first and the second optical receivers 250 and 260 include photo-diodes or PD-TIA modules.

The optical transmitter 270 outputs the third optical signal 285 to the first optical path 221. The optical transmitter 270 may include laser diodes or LD-MPD modules.

The first and the second optical receivers 250 and 260 may be located at one side of the first and the second trenches 224 and 225 and the optical transmitter 270 may be located at the other side of the first and the second trenches 224 and 225. This configuration may be used to reduce crosstalk between the first and the second optical receivers 250 and 260 and the optical transmitter 270 while reducing the size of the platform 220, which directly relates to the size of the optical triplexer 200.

In this way, the optical triplexer 200 can reduce any electrical and optical crosstalk problems between the optical transmitter 270 and the first or the second optical receiver 250 or 260. However, in the configuration shown in FIG. 2, there may still be some crosstalk between the first optical receiver 250 and the second optical receiver 260.

The first optical signal 280 input to the first optical path 221 from the external optical waveguide 210 is reflected by the first filter 230. The reflected first optical signal 280 is detected by the first optical receiver 250. The second optical signal 285, which is transmitted by the first filter 230 and is input to the second filter 240, is reflected by the second filter 240. The reflected second optical signal 285 is detected by the second optical receiver 260. The third optical signal 275 output from the optical transmitter 270 sequentially passes through the second filter 240 and the first filter 230 and is output to the external optical waveguide 210.

Ideally, the first filter 230 completely reflects the first optical signal 280. However portion of the first optical signal 280 may be transmitted. The transmitted portion of the first optical signal 280 is reflected by the second filter 240 and proceeds to the third optical path 223. This portion of the first optical signal 280 proceeding to the third optical path 223 causes a crosstalk phenomenon to the second optical receiver 260. Unlike crosstalk between an optical transmitter and an optical receiver, which is caused due to a close physical distance between the first and the second optical receivers 250 and 260, such crosstalk phenomenon is caused because of a wavelength difference between the first optical signal 280 to be detected by the first optical receiver 250 and the second optical signal 285 to be detected by the second optical receiver 260 is very small so that the first filter 230 cannot completely discriminate wavelengths. In particular, since the intensity of an analog signal is typically about 10 dB larger than that of a digital signal, even though it varies depending on data formats of the signals, crosstalk of the second optical receiver 260 may cause significant problems.

Hereinafter, various methods of solving the above-described crosstalk will be described according to second to fourth embodiments of the present invention.

Figure 3:
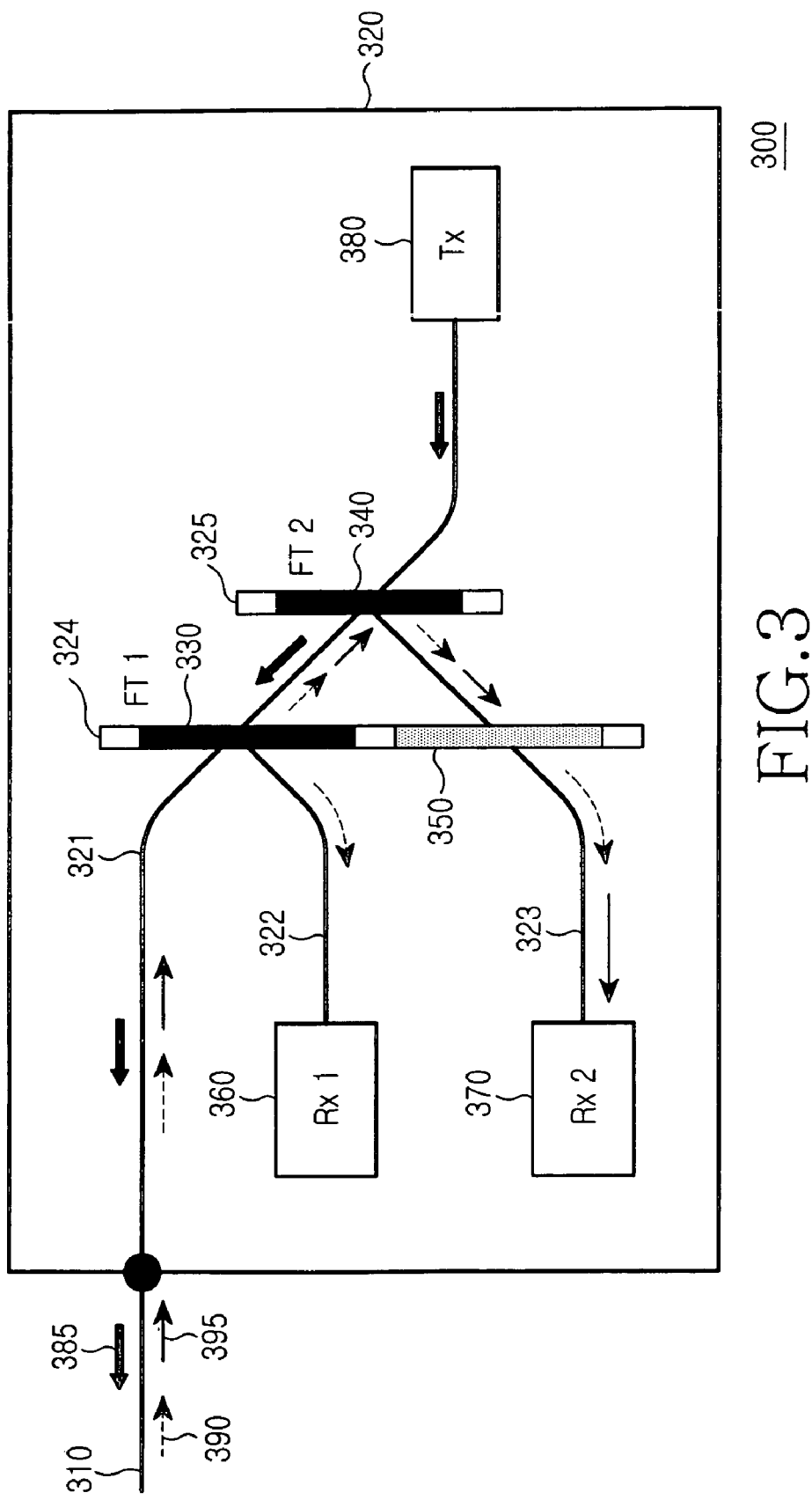
FIG. 3 is a diagram showing a bidirectional optical triplexer according to a second embodiment of the present invention.

FIG. 3 is a diagram showing a bidirectional optical triplexer 300 according to a second embodiment of the present invention.

Referring to FIG. 3, the optical triplexer 300 includes a platform 320 which has first to third optical paths 321 to 323 and first and second trenches 324 and 325, first to third filters 330 to 350, first and second optical receivers 360 and 370, and an optical transmitter 380. When comparing the structure of the optical triplexer 300 with the structure shown in FIG. 2, there is one difference in that the optical triplexer 300 additionally has a third filter 350. Therefore, redundant descriptions will be omitted.

The platform 320 includes the first optical path 321, which may be optically connected with an external optical waveguide 310, first and second trenches 324 and 325, which are spaced from each other on the first optical path 321, the second optical path 322, which extends from the first trench 324, and a third optical path 323, which extends from the second trench 325. The first trench 324 extends crossing the third optical path 323, so that the first trench 324 is located between the first optical path 321 and the third optical path 323.

The third filter 350 is positioned in the first trench 324 in line with the first filter 330. The third filter 350 transmits the second optical signal 395 proceeding through the third optical path 323. In addition, the third filter 350 reflects an optical signal of a predetermined wavelength, i.e., the first optical signal 390, which has passed through the first filter 330 and reflected by the second filter 340, so that the third filter 350 allows the first optical signal 390 reflected by the third filter 350 to obviate from the third optical path 323.

Since a portion of the first optical signal 390 may ultimately be input to the second optical receiver 370, this acts as crosstalk. However, the portion is reflected twice by the first and the third filters 330 and 350 so as to be attenuated. Accordingly, the first optical signal 390 exerts little influence on an operation of the second optical receiver 370. Since the third filter 350 has no restrictions about the third optical signal 385, the third filter 350 is relatively advantageous in view of a yield rate and a cost for manufacturing the filters. Also, since a manufacturing process of a trench of the third filter 350 is not additionally required, the yield rate for the filters is not suddenly decreased.

Figure 4:
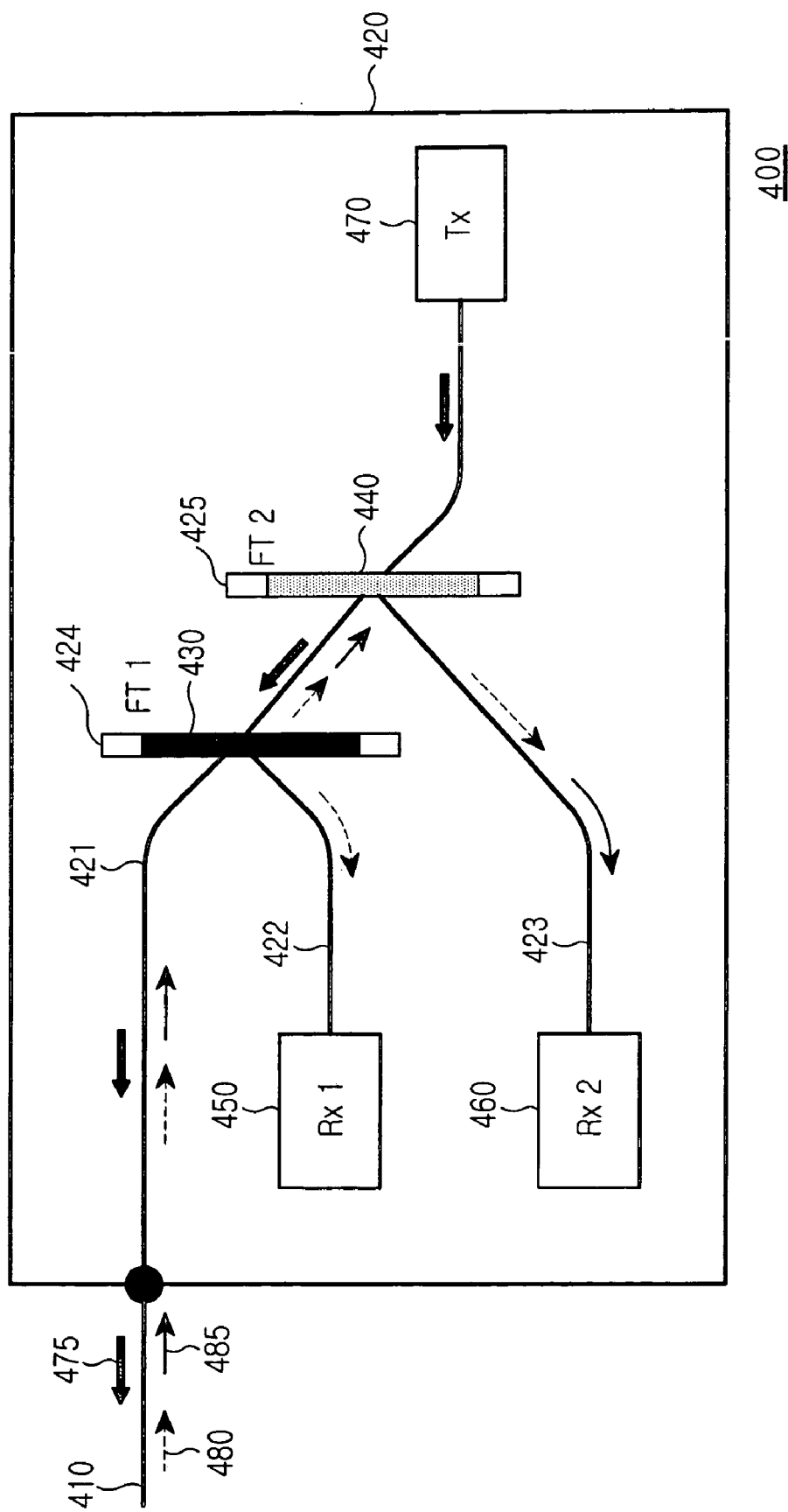
FIG. 4 is a diagram showing a bidirectional optical triplexer according to a third embodiment of the present invention.
Figure 5A:
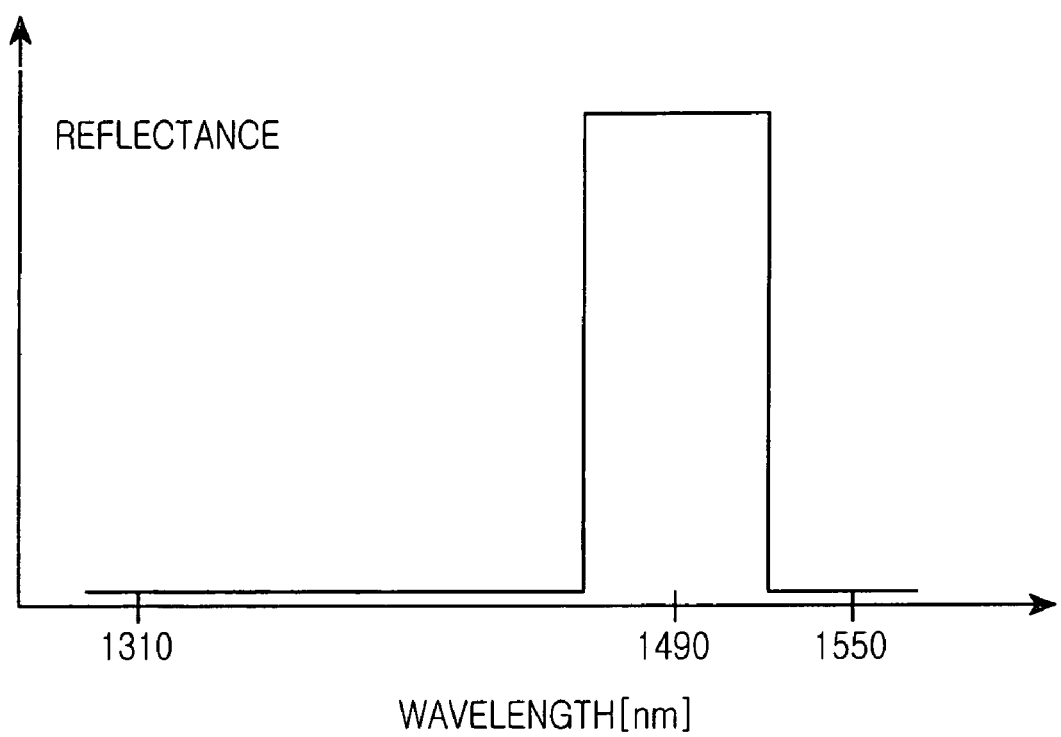
FIG. 5a is a graph representing reflection characteristic of a second filter shown in FIG. 4.

FIG. 4 is a diagram showing a bidirectional optical triplexer 400 according to a third embodiment of the present invention. FIG. 5a is a graph representing the reflection characteristic of the second filter 440. The optical triplexer 400 includes a platform 420 which has first to third optical paths 421 to 423 and first and second trenches 424 and 425, first to second filters 430 to 440, first and second optical receivers 450 and 460, and an optical transmitter 470. When comparing the structure of the optical triplexer 400 with the structure shown in FIG. 2, the optical triplexer 400 has only one difference in that the optical triplexer 400 uses the second filter 440 having different characteristic from that of the structure shown in FIG. 2. Therefore, redundant descriptions will be omitted.

The second filter 440 is positioned in the second trench 425. The second filter 440 reflects the second optical signal 485 proceeding through the first optical path 421. In addition, the second filter 440 transmits optical signals having predetermined wavelengths, i.e., the first and the third optical signals 480 and 475. Since a portion of the first optical signal 480, may ultimately be input to the second optical receiver 460, this acts as crosstalk. However, the portion is reflected twice by the first and the second filters 430 and 440 so as to be attenuated. Accordingly, the portion of the first optical signal 480 exerts little influence on the operation of the second optical receiver 460. In this case, since it is unnecessary to additionally manufacture filters or trenches and to perform a process for inserting the filters and it is enough for a filter type to be changed into a band-pass filter, this is an advantageous method for a platform. However, it is relatively difficult to manufacture the band-pass filter, particularly, due to a small wavelength difference between the first and the second optical signals 480 and 485. In addition, the band-pass filter has an expensive cost so that the entire cost of the optical triplexer may increase.

Figure 5B:
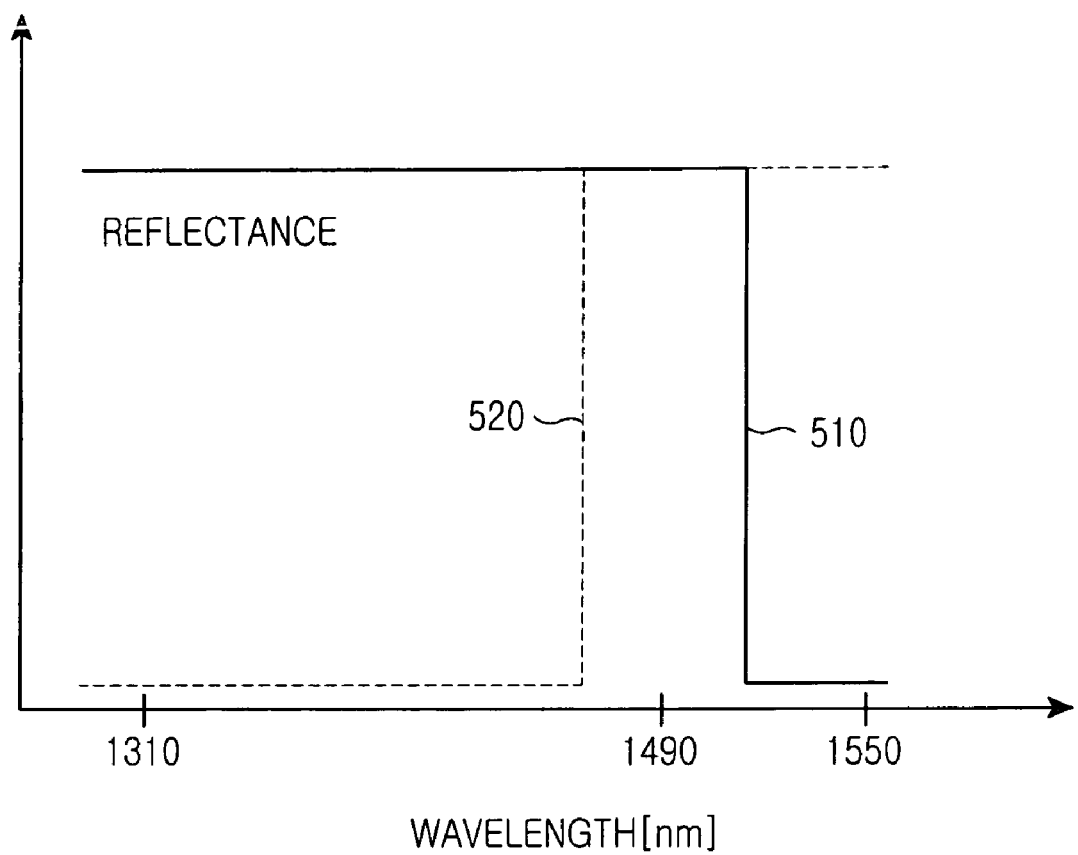
FIG. 5b is a graph representing reflection characteristic of a second filter shown in FIG. 4.

A reflection characteristic of the second filter 440 can be obtained by combining a reflection curve 510 of the first filter 230 with a reflection curve 520 of the second filter 240 as shown in FIG. 5b. Hereinafter, a structure realized based on the above description will be described according to the fourth embodiment of the present invention.

Figure 6:
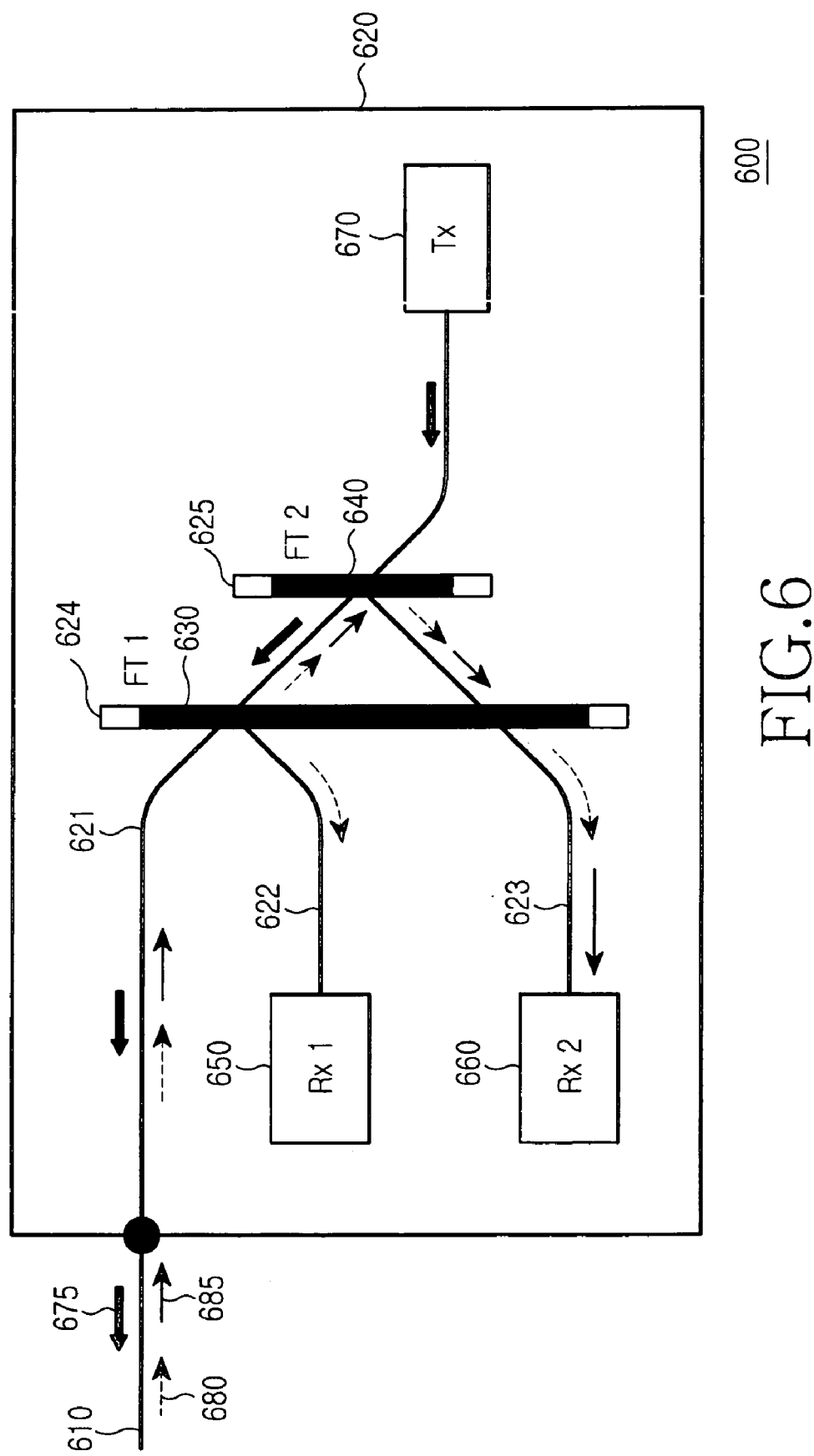
FIG. 6 is a diagram showing a bidirectional optical triplexer according to a fourth embodiment of the present invention.

FIG. 6 is a diagram showing a bidirectional optical triplexer 600 according to a fourth embodiment of the present invention. The optical triplexer 600 includes a platform which has first to third optical paths 621 to 623 and first and second trenches 624 and 625, first and second filters 630 and 640, first and second optical receivers 650 and 660, and an optical transmitter 670. Since the structure of the optical triplexer 600 is similar to the structure shown in FIG. 2, redundant descriptions will be omitted.

The platform 620 includes the first optical path 621 that may be optically connected with an external optical waveguide 610, the first and the second trenches 624 and 625 which are spaced from each other on the first optical path 621, the second optical path 622 which extends from the first trench 624, and the third optical path 623 which extends from the second trench 625. The first trench 624 extends crossing the third optical path 623, so that the first trench 624 is located between the first optical path 621 and the third optical path 623.

The first filter 630 is positioned in the first trench 624. The first filter 630 reflects the first optical signal 680 proceeding through the first optical path 621. The first filter 630 transmits optical signals having predetermined wavelengths, which are the second and the third optical signals 675 and 685. The first filter 630 reflects the first optical signal 680 proceeding through the third optical path 623 and transmits an optical signal having a predetermined wavelength, i.e., the second optical signal 685. The portion of the first optical signal 680, which has been passed through an upper part of the first filter 630 and reflected by the second filter 640, is reflected from a lower part of the first filter 630, thereby allowing the first optical signal 680 to obviate from the third optical path 623. Since the portion of the first optical signal 680 that may ultimately be input to the second optical receiver 660 acts as crosstalk, it is reflected twice by the first filter 630 so as to be attenuated. Accordingly, the first optical signal 680 exerts little influence on an operation of the second optical receiver 660.

In the optical triplexer 600, since it is unnecessary to additionally manufacture filters or trenches and to perform a process for inserting the filters, additional manufacturing costs for the optical triplexer 600 are not incurred. Since the first to the third optical paths 621 to 623 are connected to the first filter 630 with an incident/reflective/transmissive structure, designing the optical paths is more or less complicated and is very sensitive to sizes of the optical paths. However, the optical paths can be easily realized, for example, by using a polynomial curve design.

Table 1 represents characteristics according to the second to the fourth embodiments of the present invention as compared with characteristics of a conventional example shown in FIG. 1.

TABLE 1

|  | Additional filters are required. | Manufacture of addition trenches is required | Inserting of additional filters is required | Decrease of filter yield rate | Complexity of optical path design |
|---|---|---|---|---|---|
| Conventional example | O | O | O | X | X |
| Second embodiment | O | X | O | X | X |
| Third embodiment | X | X | X | O | X |
| Fourth embodiment | X | X | X | X | O |

As described above, in the bidirectional optical triplexer embodiments according to the present invention, the first and the second trenches may be located between the first and the second optical receivers and the optical transmitter, so that it is possible to minimize the size of the platform and to reduce crosstalk between elements.

Also, the bidirectional optical triplexer embodiments according to the present invention can be designed to reduce crosstalk between elements by having a structure for reflecting a plurality of optical signals acting as crosstalk. Furthermore, the bidirectional optical triplexer embodiments according to the present invention can be designed to reduce manufacturing costs as well as minimizing crosstalk between elements by positioning two filters in one trench, using a band-pass filter, or arraying one filter in such a manner that the filter crosses two optical paths.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A bidirectional optical triplexer comprising:
   a platform having first and second trenches spaced from each other on a first optical path that may be optically connected to an external optical waveguide;
   a first filter positioned in the first trench arranged to reflect a first optical signal proceeding through the first optical path to a second optical path;
   a second filter positioned in the second trench arranged to reflect the second optical signal proceeding through the first optical path to a third optical path;
   a first optical receiver arranged to detect the first optical signal proceeding through the second optical path;
   a second optical receiver arranged to detect a second optical signal proceeding through the third optical path; and
   an optical transmitter arranged to output a third optical signal to the first optical path, wherein the first and the second optical receiver are aligned at a first side of the first and the second trenches and the optical transmitter is aligned at a second side of the first and the second trenches, the first side being opposite to the second side about the first and second trenches.

2. The bidirectional optical triplexer as claimed in claim 1, wherein the first filter reflects the first optical signal proceeding through the first optical path to the second optical path and transmits optical signals having predetermined wavelengths different from a wavelength of the first optical signal, and the second filter transmits the third optical signal proceeding through the first optical path and reflects optical signals having predetermined wavelengths different from a wavelength of the third optical signal to the third optical path.

3. The bidirectional optical triplexer as claimed in claim 1, further comprising a third filter positioned in the first trench that reflects the first optical signal proceeding through the third optical path.

4. The bidirectional optical triplexer as claimed in claim 3, wherein the first trench extends crossing the third optical path.

5. The bidirectional optical triplexer as claimed in claim 1, wherein the first filter reflects the first optical signal proceeding through the first optical path to the second optical path and transmits optical signals having predetermined wavelengths different from a wavelength of the first optical signal, and the second filter reflects the second optical signal proceeding through the first optical path to the third optical path and transmits optical signals having predetermined wavelengths different from a wavelength of the second optical signal.

6. The bidirectional optical triplexer as claimed in claim 1, wherein the first trench and the first filter extend crossing the third optical path, wherein a first part of the first filter reflects the first optical signal proceeding through the first optical path and transmits optical signals having predetermined wavelengths different from a wavelength of the first optical signal, and a second part of the first filter reflects the first optical signal, which has been passed through the first part of the first filter and reflected by the second filter.

7. A bidirectional optical triplexer comprising:
   a platform having first and second trenches arranged substantially parallel to each other on a first optical path that may be optically connected to an external optical waveguide;
   a first filter positioned in the first trench arranged to reflect a first optical signal proceeding through the first optical path to a second optical path;
   a second filter positioned in the second trench arranged to reflect a second optical signal proceeding through the first optical path to a third optical path;
   a first optical receiver arranged to detect the first optical signal proceeding through the second optical path;
   a second optical receiver arranged to detect the second optical signal proceeding through the third optical path; and an optical transmitter arranged to output a third optical signal to the first optical path, wherein the first and second trenches are aligned between at least one of the first or the second optical receivers and the optical transmitter.

8. The bidirectional optical triplexer as claimed in claim 7, wherein the first filter reflects the first optical signal proceeding through the first optical path to the second optical path and transmits optical signals having predetermined wavelengths different from a wavelength of the first optical signal, and the second filter transmits the third optical signal proceeding through the first optical path and reflects optical signals having predetermined wavelengths different from a wavelength of the third optical signal to the third optical path.

9. The bidirectional optical triplexer as claimed in claim 7, further comprising a third filter positioned in the first trench that reflects the first optical signal proceeding through the third optical path.

10. The bidirectional optical triplexer as claimed in claim 9, wherein the first trench extends crossing the third optical path.

11. The bidirectional optical triplexer as claimed in claim 7, wherein the first filter reflects the first optical signal proceeding through the first optical path to the second optical path and transmits optical signals having predetermined wavelengths different from a wavelength of the first optical signal, and the second filter reflects the second optical signal proceeding through the first optical path to the third optical path and transmits optical signals having predetermined wavelengths different from a wavelength of the second optical signal.

12. The bidirectional optical triplexer as claimed in claim 7, wherein the first trench and the first filter extend crossing the third optical path, wherein a first part of the first filter reflects the first optical signal proceeding through the first optical path and transmits optical signals having predetermined wavelengths different from a wavelength of the first optical signal, and a second part of the first filter reflects the first optical signal, which has been passed through the first part of the first filter and reflected by the second filter.

* * * * *